Nov. 16, 1965 W. W. ATWOOD 3,217,943
SOLIDS FEEDER DEVICE
Filed June 18, 1964 3 Sheets-Sheet 1

INVENTOR.
WESLEY WILLIAM ATWOOD
BY
ATTORNEY

Nov. 16, 1965 W. W. ATWOOD 3,217,943
SOLIDS FEEDER DEVICE
Filed June 18, 1964 3 Sheets-Sheet 3

INVENTOR.
WESLEY WILLIAM ATWOOD
BY
ATTORNEY

United States Patent Office 3,217,943
Patented Nov. 16, 1965

3,217,943
SOLIDS FEEDER DEVICE
Wesley William Atwood, Lakeland, Fla., assignor to American Cyanamid Company, Stamford, Conn., a corporation of Maine
Filed June 18, 1964, Ser. No. 376,157
2 Claims. (Cl. 222—189)

The present invention relates to a novel solids feeder device. More particularly, it relates to a novel hopper employed in the proportional feeding and handling of finely divided solids. Still more particularly, the invention is concerned with a solids feeder device which prevents the bridging of finely divided confined solids.

In the past, finely divided solids have been fed to conveyor belts, or directly to reaction vessels, by means of knife gates, feeding screws or rotary star valves. Unfortunately, these are costly to install, difficult to instrument, costly to maintain and, generally, inaccurate in so far as measuring definite quantities are concerned. Dependability and controllability of solids passing through a feeding screw or a rotary star valve are difficult to obtain. In general, dusts in the 200 to 300 mesh range change in bulk density because of aeration when agitated during material handling. Higher material temperatures increase the ease of aeration. Thus, higher temperatures promote fluidity. However, upon standing or settling, such materials tend to pack, arch and bridge. The controllability, accuracy and dependability of the feed charge is hindered as a result of the variable bulk density and handling characteristics. If a feeding device could be provided whereby finely divided dusts could be accurately controlled through an aperture, such a device would be highly desirable in the art.

It is, therefore, a principal object of the invention to avoid both the problems of bridging and excess fluidity of finely divided dusts in presently known apertures. It is a further object to provide a feeding device of low initial cost which is dependable and results in reproducible, continuous charging regardless of physical condition of feed relative to bulk density. It is a still further object of the invention to provide a feeding device which is of low cost to maintain and easy to apply to any known weighing system. Other advantages of the invention will be made apparent upon a consideration of the ensuing description.

To this end, there is provided a novel solids feeder device comprising a suitable hopper, having a pyramidal, hyperbolic or conical configuration. At the apex or bottom of the hopper, there is provided a butterfly valve in a chamber having a clean-out opening. To the latter chamber, there is attached an air pad comprising an air-slide fabric or any equivalent perforated material surrounding an aperture which is centrally positioned in the air pad. Beneath the air-slide fabric, an air line is provided to introduce air for blowing through the air pad. Finally, there is attached to the air pad a direct air-operated pinch valve.

In the foregoing arrangement of elements, a finely divided dust can be "kept fluid" or "fluidized" and fed through the hopper, thereby avoiding the troublesome problem of bridging or arching. Advantageously, continuous feeding of the finely divided solids is readily accomplished through the hopper of the invention.

The accompanying drawings illustrate a preferred embodiment of the invention in which.

Figure 1:
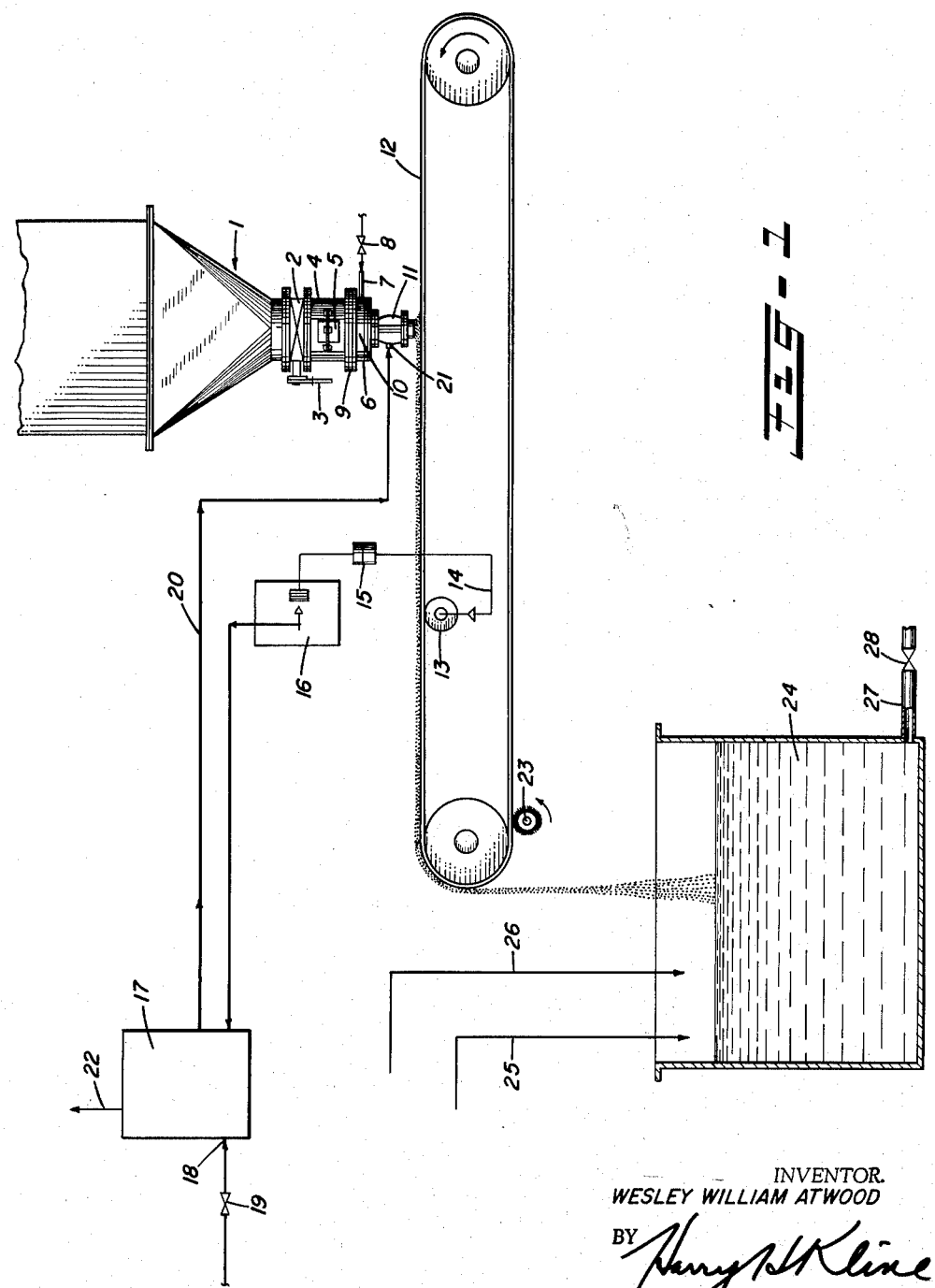
FIGURE 1 is a perspective view of the overall solids feeding device in relation to a circuit provided for the accurate measurement of solids flowing through a hopper cone.

Referring now to the drawings, there is shown in FIG. 1 a hopper 1 in which a phosphate rock dust or other ground solids in which at least 85% of the rock dust passes through a 200 mesh screen. As is known, when same such finely divided solids are warm and agitated, they flow like water because of their low bulk density. However, the same particles will tend to pack when deaerated and settled and assume a high bulk density. On occasion, foreign material introduced into the hopper, tends to block passage through the hopper. A butterfly valve 2 is provided at the bottom of the hopper. The valve, as shown, is manually operated by a handle device 3. As valve 2 opens, the dust will pass through the aperture into a clean-out zone 4 provided with a window clean-out port 5 so that foreign material, occasionally introduced along with the rock dust, can be readily scooped out. Further, since the dust tends to pack or cake at any point in the hopper, an air pad 6 is provided. To the air pad is inserted line 7 through which air is continuously introduced through the valve 8. As air is introduced through line 7, it circulates around the aperture 10 of the air pad and passes through an air-slide fabric 9. Finally, since the dust also tends to flow like water, the finely divided material passes through an air-operated pinch valve 11 when it is open. The material is also controlled as a fluid.

The finely divided rock is introduced to a conveyor belt 12 and is measured by means of a weigh-idler 13 constituting a portion of the overall lever system 14. If too much material is introduced to the conveyor belt, pressure on the weigh-idler 13 is mechanically transmitted to a hydraulic load cell 15, which in turn exerts pressure on the pneumatic transmitter 16. A signal air pressure, which is proportional to the weight of the dust on the weigh-idler is produced and transmitted to a pneumatic proportional band controller 17, provided with an air inlet 18 and valve 19. The controller 17 compares the incoming air signal with its pre-set feed point. If the point is too high, a change in air pressure is effected, that is, an increased volume of air is directed through a line 20, attached to the pinch valve 11, said line being attached at inlet port 21. This increase in air pressure throttles the air operated pinch valve 11 by causing diaphragms to expand. The material fed to the conveyor belt 12 is substantially reduced. If on the other hand too little solids are added to the conveyor belt 12, the weigh-idler exerts a lesser pressure on the hydraulic load cell 15 which exerts a pressure on the pneumatic transmitter 16. A lower signal air pressure is next transmitted to the controller 17. Thus, the controller 17 sensing this under weight of feed material decreases its output of air pressure, thereby causing the pinch valve 11 to open. Dust material now flows through the overall hopper onto the conveyor belt 12 to conform with a pre-set weight point so that accurate amounts of solids may be added to, for instance, a reaction vessel 24.

The controller 17 accurately regulates the overall air supply to the pinch valve 11. The air entering the controller 17 and supplied to the pinch valve is exhausted through the controller at point 22.

The finely divided solids are cleaned from the conveyor belt 12 by means of a belt cleaner 23. As is shown in FIG. 1, the solids which may illustratively comprise phosphate rock dust fall into the reaction vessel 24 in pre-determined and accurately measured quantities to which is added pre-determined amounts of phosphoric acid and sulfuric acid, introduced through lines 25 and 26, respectively. Resultant product is then withdrawn through line 27 regulated by on-off valve 28 for further processing.

Figure 2:
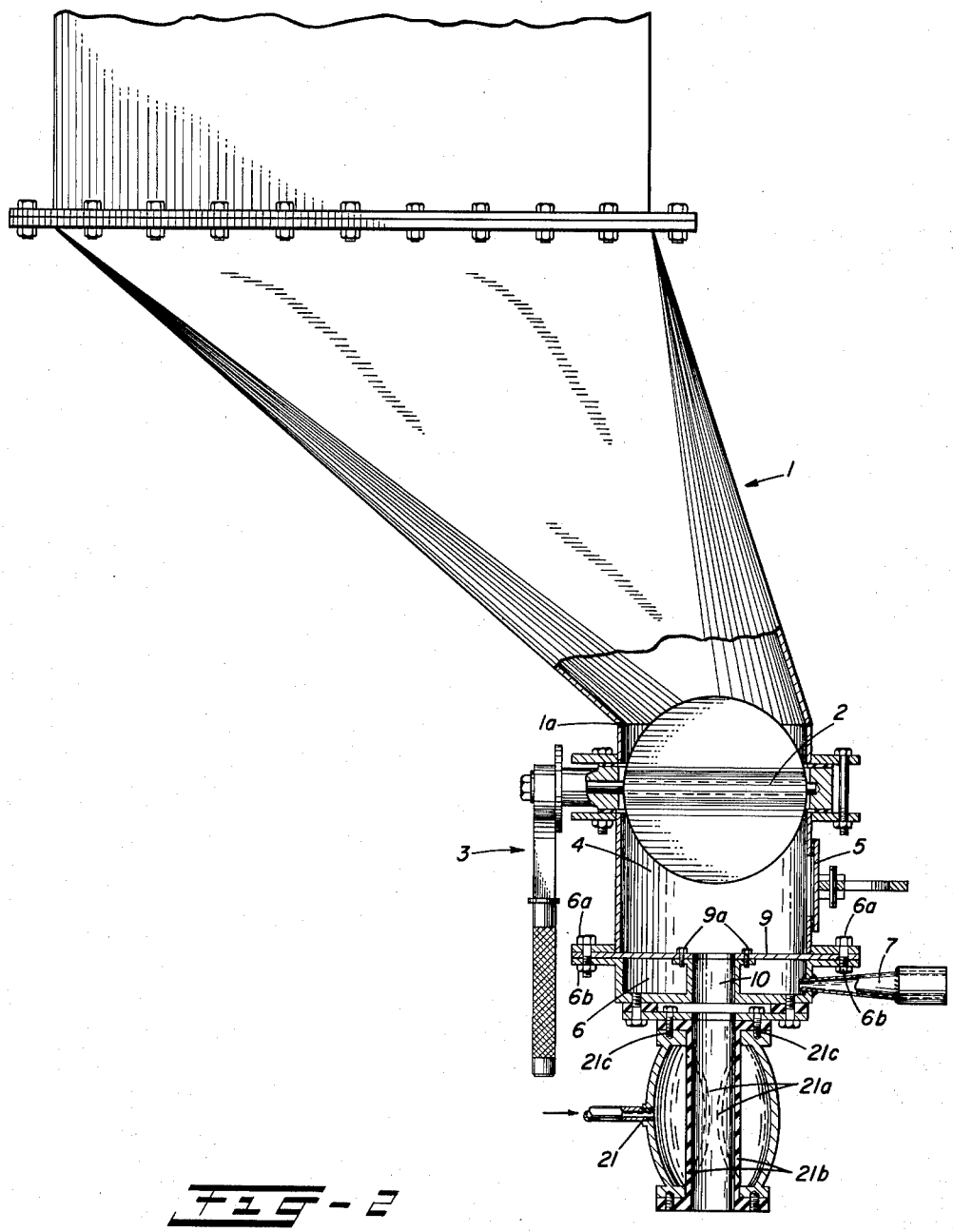
FIGURE 2 is a cross-sectional view of the overall hopper.

In FIG. 2 there is shown an enlarged cross-sectional view of the overall hopper cone device. As previously stated, the overall hopper is shown at 1 to which butterfly valve 2 is attached at the apex of the hopper. The on-off positioning of the valve is controlled by means of an external handle 3. At the apex, there is also provided a clean-out zone 4 to which a clean-out aperture 5 is further provided. At the bottom of the clean-out zone 4 there is provided a flange 4a, to which a metal air pad 6 is attached by means of nuts 6a and bolts 6b attached to said flange. The air pad 6 is further provided with an air inlet line 7 which permits 3–6 p.s.i.g. air to circulate around aperture 10. The introduced air passes through an air-slide cloth 9, secured by means of bolts 9a, to the air pad body 6 which distributes the air around the aperture to maintain even pressure on the air slide fabric. The air then passes through the clean-out zone, finally leaving the hopper and is filtered prior to atmospheric exhaust. The circulation thus prevents arching or bridging caused by packed particles in the hopper. As the solids material passes through the aperture 10 into a pinch valve 11, its flow is regulated by the air pressure introduced at port 21 and exerted against diaphragm 21a. Where the air pressure exerted on the diaphragm 21a is excessive, it will be noted that a throttling or restriction to the flow of the solids material occurs. Where the air pressure on the diaphragm 21a is reduced, the restriction is relaxed and the solids material flows more readily because the diaphragm is relaxed as shown in 21b. Thus, the pinch valve provides for the regulated flow of the fluidized semi-solid material conditioned to a uniform bulk density by the aeration through the air pad. The pinch valve is mechanically attached to the air pad at 21c.

Figure 3:
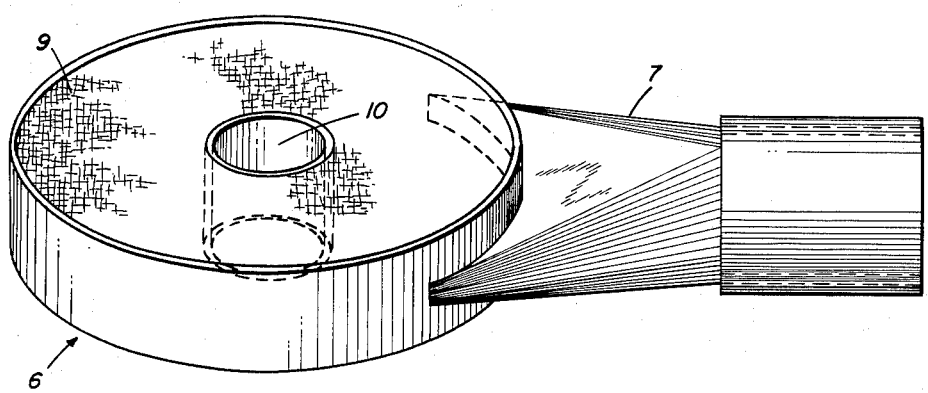
FIGURE 3 is a schematic perspective view of the air pad employed in the overall hopper.

In FIG. 3, there is shown an enlarged simplified perspective view of the air pad 6. As shown, the air pad is a pan-like structure fabricated of metal having an aperture 10 located in the midpoint of the air pad. There is also provided an air-slide fabric 9 in which an aperture in the air-slide fabric is provided in line with the aperture 10. The mounting of the air-slide fabric is more readily shown in FIG. 2. There is also provided an air line attached through a side of the air pad shown at 7. Although an air-slide cloth is employed, any equivalent thereof is also contemplated. Thus, for instance, suitable porous metal, ceramic or other media can, if desired, be provided in lieu of the air-slide cloth.

In general, finely divided solids at elevated temperatures of about 120° F. or more, upon processing or handling involving agitation, pouring, scooping and the like, assume lower bulk density than cold solids under the same material handling environment. Thus, a hot dust is more difficult to control by conventional methods because it behaves more like water than a cold dust will with equivalent or similar handling. Advantageously, the solids feeder of the present invention will handle cold and hot dust materials equally well.

I claim:

1. A solids feeder device adapted for the accurate and dependable regulation of finely divided solids passing through said device, which comprises in combination: a hopper, a butterfly valve located at the apex of said hopper, a clean-out zone which houses said butterfly valve, a clean-out aperture adapted to provide for ready accessibility to said zone, an air pad attached to the clean-out zone characterized by a centrally located solids outlet aperture having finely divided openings surrounding said aperture at its uppermost extremity for distributing air evenly into material located above the air pad, said air pad being fabricated of a porous material, means for introducing air into the air pad, a direct air operated pinch valve attached directly to the air pad, and means for introducing and controlling air to said pinch valve.

2. A device according to claim 1, in which the area which surrounds the centrally positioned aperture of the air pad is fabricated of an inert air-slide fabric, containing a multitude of intimate openings for passing and distributing the flow of air for introduction into the solid material in the hopper.

References Cited by the Examiner
UNITED STATES PATENTS 3,103,300    9/1963    Lau _____ 222—195
3,104,030    9/1963    Howlett _____ 222—195

LOUIS J. DEMBO, *Primary Examiner.*